United States Patent

[11] 3,571,753

[72] Inventor Teddy G. Saunders
Atherton, Calif.
[21] Appl. No. 855,487
[22] Filed Sept. 5, 1969
[45] Patented Mar. 23, 1971
[73] Assignee Moore Associates, Inc.
San Carlos, Calif.

[54] PHASE COHERENT AND AMPLITUDE STABLE FREQUENCY SHIFT OSCILLATOR APPARATUS
12 Claims, 4 Drawing Figs.

[52] U.S. Cl. .......... 331/115, 331/132, 331/135, 331/179, 333/80
[51] Int. Cl. .......... H03b 7/00
[50] Field of Search .......... 331/115, 132, 135, 137, 140, 141, 177, 179; 333/80, 80 (T)

[56] References Cited

UNITED STATES PATENTS 3,432,774 3/1969 Fick .......... 331/141
3,491,311 1/1970 Meyer et al. .......... 331/177X
3,514,717 5/1970 Rose et al. .......... 331/179X

*Primary Examiner*—Roy Lake
*Assistant Examiner*—Siegfried H. Grimm
*Attorney*—Harvey G. Lowhurst

ABSTRACT: A phase coherent and amplitude stable frequency shift oscillator apparatus comprising a negative impedance converter, biased into an unstable oscillatory condition, in combination with a pair of impedances respectively coupled to the input terminals thereof for determining the frequency of oscillation. One of the impedances includes a series resistive-reactive impedance circuit and the other includes a parallel resistive-reactive impedance circuit. Means are provided for changing the value of the resistive components of the impedances in order to alter the output frequency of the oscillator apparatus and a level limiting and buffering means is provided for stabilizing the oscillatory operation and buffering the output obtained from the apparatus.

INVENTOR
TEDDY G. SAUNDERS
BY
ATTORNEY

INVENTOR
TEDDY G. SAUNDERS
BY Harvey J. Lowhurst
ATTORNEY

PHASE COHERENT AND AMPLITUDE STABLE FREQUENCY SHIFT OSCILLATOR APPARATUS

BACKGROUND OF THE INVENTION

The present invention relates generally to electronic function generation apparatus and, more particularly, to a novel phase coherent and amplitude stable frequency shift oscillator apparatus including a simple negative impedance converter and a pair of resistance-reactance filters.

There are many applications wherein it is desirable that a signal generating source be provided which is capable of switching between two or more frequencies without the introduction of transitional distortion. In one such application namely, wherein the source is utilized in a data transmission system to produce square wave transmissions in the form of frequency modulated pulses, it is particularly desirable that there be no phase or amplitude change in the waveform as it is shifted from one frequency to another. The reason is, of course, obvious in that the remote detector may be confused by any spurious signal components introduced into the transmission during the transition from one frequency to another.

Heretofore, the means used to provide signals of different frequencies have typically been LC oscillators wherein the frequency is changed by substituting a different inductance or capacitance into the tank circuit. However, since the capacitor or inductor is an energy storage element, the effect of substituting one capacitance or inductance for another is to cause a change in both the signal amplitude and phase of the oscillator output. This results in signal distortion which can produce serious consequences at the receiver end of the transmission line.

Function generators related to the present invention are also used in signal synthesizing and FM modulation equipment wherein a frequency is either changed linearly over a given range, or one or more of several frequencies are selected or combined to produce an output signal of some desired characteristic. However, because of the amplitude and phase discontinuities which are inherent in the apparatus previously utilized, it has heretofore been difficult to obtain output signals having absolute phase coherence and signal amplitude stability.

OBJECTS OF THE PRESENT INVENTION

It is therefore a principal object of the present invention to provide a simple frequency shift oscillator apparatus which is capable of changing from one frequency to another with no discontinuity in the phase or amplitude of the output signal.

Another object of the present invention is to provide a novel frequency shift oscillator apparatus which in shifting between one or more frequencies maintains absolute phase coherence and amplitude stability.

Still another object of the present invention is to provide a novel function generating apparatus which utilizes resistive frequency determining elements so as to be capable of being switched between two or more frequencies with no transitional distortion.

Still another object of the present invention is to provide a novel frequency shift oscillator apparatus which uses a negative impedance converter active RC filter as a frequency generating means wherein the output frequency thereof can be selectively changed by simply switching resistances into or out of the frequency controlling circuitry.

SUMMARY OF THE INVENTION

In accordance with the present invention, an active filter circuit, including a series resistive-reactive impedance, a parallel resistive-reactive impedance and a negative impedance converter which is biased into an unstable oscillatory condition is utilized as an oscillator having an output frequency which is determined by the two impedances. A signal level limiter is used to stabilize the oscillation and provide an output signal of constant amplitude. Since the frequency of oscillation is determined by resistive-reactive impedance elements instead of by reactive elements alone, the oscillatory frequency of the device can be changed by simply changing the resistances of the respective resistive components. Since these elements are passive in nature, no phase shift or other undesirable distortion is thereby introduced into the output signal.

A principal advantage of the present invention is that by a simple switching action the frequency determining resistances can be altered to change the oscillatory frequency of the device from one frequency to another without introducing any undesirable change in signal amplitude or phase.

Still other advantages of the present invention will become apparent to those of skill in the art after having read the following detailed disclosure of preferred embodiments which are illustrated in the several FIGS. of the drawing.

IN THE DRAWING

DETAILED DESCRIPTION OF THE PRESENT INVENTION

Figure 1:
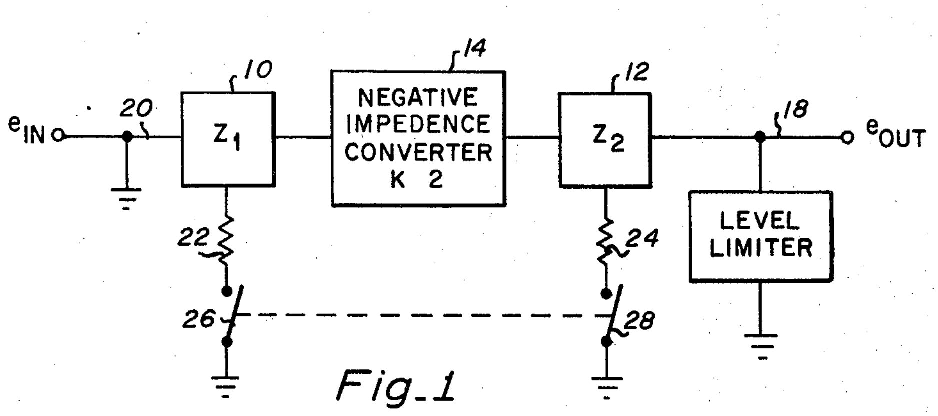
FIG. 1 is a block diagram representation of a frequency shift oscillator in accordance with the present invention.

Turning now to FIG. 1 of the drawing, a block diagram of the present invention is illustrated which includes a negative impedance converter band-pass filter comprised of a pair of resistive-reactive impedance elements 10 and 12 and a negative impedance converter 14. The impedance elements 10 and 12 are preferably comprised of like resistances and capacitances with one being in parallel and the other being in series although they could just as well be comprised of resistors and inductors arranged in suitable series and parallel combinations.

The Laplacean transfer function of this circuit may be expressed as $$\frac{e_{out}}{e_{in}}=\frac{KST}{(ST)^2+(2-K)ST+1} \tag{1}$$

where $$T=RX$$

and $$ST=j\omega RX$$

with $R$ being the resistive component of the impedance elements 10 and 12, $X$ being the reactive elements thereof and $K$ being the gain of the converter 14. Thus, where $K$ is made greater than 2 the circuit is said to be unstable and will be caused to oscillate at a frequency $$f=\frac{}{2\pi RX} \tag{2}$$

Under these conditions, a stable oscillatory network can be formed by connecting the input terminal 20 to ground and using a level limiter 16 at the output terminal 18 to stabilize the oscillations.

Since the oscillatory frequency $f$ is, as indicated in equation (2), a function of the resistive components $R$ of the impedances $Z_1$ and $Z_2$, it can be seen that by changing the value of these resistive components to $R'$, for example, the frequency of oscillation of the device can be abruptly changed to a second frequency $$f'=\frac{R+R'}{2\pi RR'} \tag{3}$$

In the circuit illustrated in FIG. 1, this can be accomplished by simply closing the switches 26 and 28 simultaneously to add the resistors 22 and 24 respectively to the resistive components of the impedances $Z_1$ and $Z_2$. Even through the frequency of the signal appearing at the output terminal 18 is caused to change abruptly, there is no change in the energy stored in the reactive components of the frequency determining impedances since only the instantaneous rate of discharge of the reactive components is changed and not the instantaneous value of the voltages applied thereto. Thus, the output signals will have a constant amplitude and there will be no phase discontinuity as the output signal shifts from $f$ to $f'$.

Figure 2:
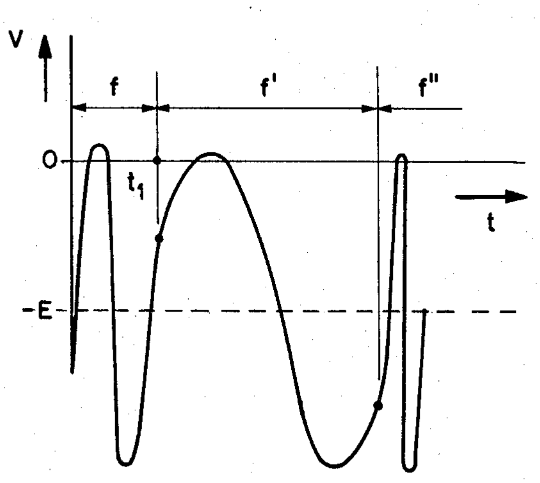
FIG. 2 is a waveform diagram illustrating the manner in which the frequency shift occurs in the present invention.

The coherent shift in frequency shift in is depicted in FIG. 2 wherein it may be noted that if as the time $t$, the switches 26 and 28 are closed, the oscillator output frequency $f$ will immediately shift to the second frequency $f$ with no significant signal discontinuity, phase shift or signal amplitude change. In this diagram the voltage −E is the bias voltage of the level limiter 16. The location of the frequency independent level limiter 16 at the oscillator output maintains the output signal amplitude constant independent of frequency.

Figure 3:
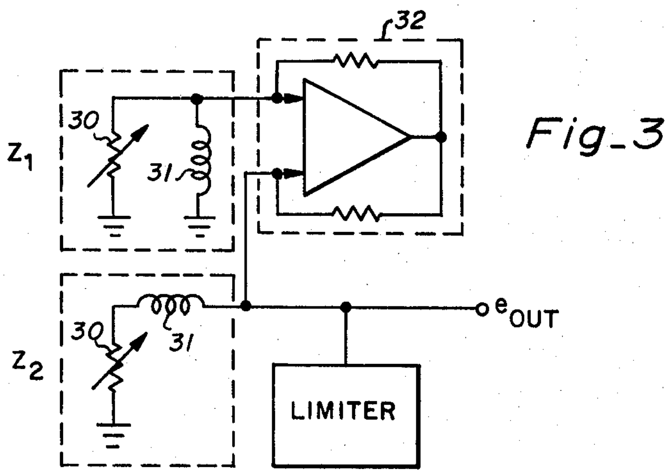
FIG. 3 is a simplified diagram illustrating the linearly variable frequency shift oscillator in accordance with the present invention.
Figure 4:
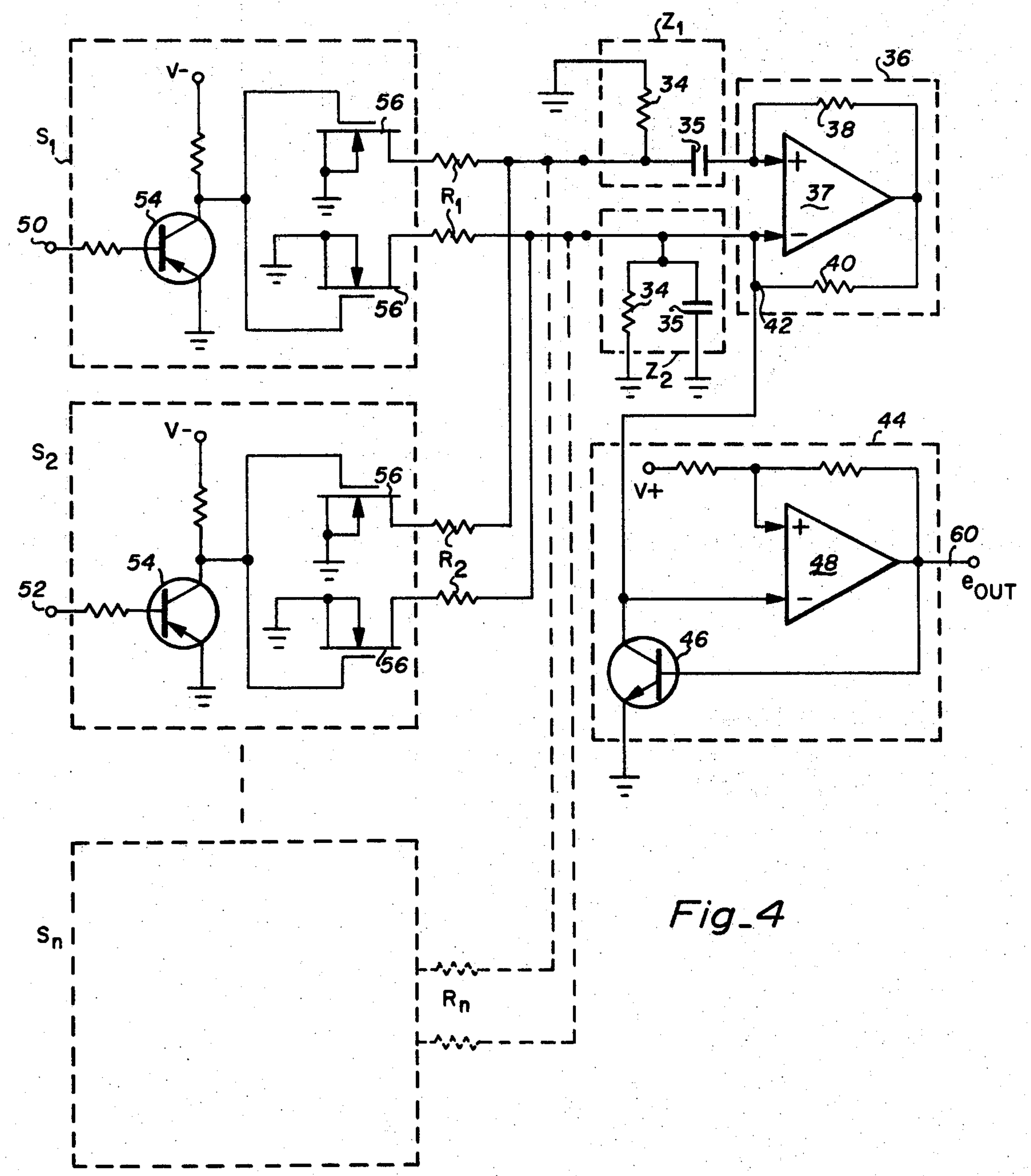
FIG. 4 is a simplified schematic of a frequency shift oscillator in accordance with the present invention.

In FIG. 3 of the drawing, an alternate embodiment of the invention is illustrated which is capable of producing a linear sweep of frequencies over some predetermined range. In this embodiment, rather than causing the resistive components of the impedances $Z_1$ and $Z_2$ to be stepwise changed from one value to another, a pair of variable resistance elements 30 are utilized to enable the resonant frequencies of the impedances to be swept over a range of frequencies. It will be noted that inductances 31 have been shown herein as the reactive elements of the impedances to illustrate that either RL or RC circuits, as illustrated in FIG. 4 below can be utilized without varying the operative principles of the invention. The operation of the negative impedance converter shown at 32 in FIG. 3 will be described in detail with regard to the embodiment illustrated in FIG. 4.

Turning now to FIG. 4 of the drawing, a practical realization of the present invention will be described in detail. In this embodiment, the impedance $Z_1$ is comprised of a series of combination of the resistance 34 and capacitance 35, while the impedance $Z_2$ is comprised of a parallel combination of resistance 34 and capacitance 35 of the same values. The negative impedance converter 36 is comprised of a differential operational amplifier 37 having one feedback path including the resistance 38 and the other feedback path including the resistance 40. Because the resistance values of these resistive elements determine the amount of amplified signal which is fed back into the respective inputs of the op-amp 37, it is their relative values which determine the quantity $K$ in equation (1) above, that is, $$K=\frac{R_{38}}{R_{40}} \qquad (4)$$

Since the circuit output is taken at point 42, which is the negative input terminal of the op-amp 37, and since taking an output at this point tends to load the amplifier input, it is necessary to provide a means for buffering the output signal thus obtained so as to prevent such detrimental loading of a part of the frequency determining circuit. Accordingly, a level limiting and buffering circuit 44 is provided which includes a level limiting amplifier 46 and a high impedance buffering op-amp 49. The transistor 46 and op-amp 48 actually cooperate to form the combined limiter-buffer 44 since the output appearing at terminal 60 of the op-amp is used to turn on the transistor 46 to limit the amplitude of the oscillations and thus stabilize the oscillatory source.

In order that the oscillatory frequency of the apparatus may be selectively changed, a plurality of switching circuits $S_1$, $S_2$, ... $S_n$ are provided, each of which include a triggering transistor 54 and a pair of FET switches 56 for selectively inserting their respective resistances R across the resistive components of the oscillator frequency determining impedances $Z_1$ and $Z_2$. To change the oscillatory frequency of the signal appearing at the circuit output terminal 60 one need merely apply a suitable potential to one or more of the terminals 50, 52 ... of the switches S so as to turn on the selected triggering transistors 54, which in turn switch on the FET's 56 to insert the selected resistances R across the resistive components 34 of the impedances $Z_1$ and $Z_2$.

For example, with all of the switches $S_1$, $S_2$, ... $S_n$ turned off, the output frequency appearing at terminal 60 will be determined solely by the value of the resistors 34 and capacitors 35 and can be expressed as $$f=\frac{1}{2\pi R_{34}C_{35}} \qquad (5)$$

However, by turning on the switch $S_1$, by applying a suitable input to terminal 50, the frequency of the signal appearing at output terminal 60 will be influenced by the additional resistances $R_1$ so that the new frequency $f_2$ will be $$f=\frac{R_{34}+R_1}{2\pi R_{34}R_1C_{35}} \qquad (6)$$

Similarly, the oscillator can be driven to a new frequency $f_3$ by turning off switch $S_1$ and turning on switch $S_2$ to replace the resistors $R_1$ in equation (6) by the resistors $R_2$. Additionally, a fourth frequency $f_4$ can be obtained by simultaneously turning on both of the switches $S_1$ and $S_2$ so that $f_4$ may be expressed as $$f=\frac{R_1R_2+R_{34}R_2+R_{34}R_1}{2\pi R_{34}R_1R_2C_{35}} \qquad (7)$$

The device may be made operable at any number of additional frequencies by merely adding additional switches S, and resistances R as indicated in the drawing.

Although only two simplified embodiments of the present invention have been particularly illustrated, it is contemplated that other means of changing the resistance values in the frequency determining circuits will be apparent to those of skill in the art. Furthermore, it is contemplated that many other alterations and modifications of the invention will become apparent to those skilled in the art after having read the above disclosure and it is therefore to be understood that this description of certain preferred embodiments is by way of illustration only and is in no manner intended to be of a limiting nature. Accordingly, I intend that the appended claims be interpreted as covering all such modifications which fall within the true spirit and scope of the invention.

I claim:

1. A phase coherent and amplitude stable frequency shift oscillator apparatus comprising:

a negative impedance converter means biased into an unstable oscillatory condition, said converter means having a pair of input terminals;

a series resistive-reactive impedance circuit coupled to one of said input terminals;

a parallel resistive-reactive impedance circuit coupled to the other of said input terminals; and signal level limiting means coupled to one of said input terminals to stabilize the oscillatory action of said apparatus and cause a stable oscillator output signal to be produced at the terminal to which it is connected.

2. A phase coherent and amplitude stable frequency shift oscillator apparatus as recited in claim 1 wherein means are provided for simultaneously changing the resistive components of said impedance circuits to cause said oscillator apparatus to oscillate at a different frequency.

3. A phase coherent and amplitude stable frequency shift oscillator apparatus as recited in claim 2 wherein said last named means includes discrete resistance means which can be selectively connected with the resistive components of said impedance circuits.

4. A phase coherent and amplitude stable frequency shift oscillator apparatus as recited in claim 2 wherein said resistive components of said impedance circuits are comprised of a variable resistance means.

5. A phase coherent and amplitude stable frequency shift oscillator apparatus as recited in claim 2 wherein said signal level limiting means includes a buffering amplifier means providing a signal output terminal, said amplifier means preventing the loading of said negative impedance converter means by the output circuit.

6. a phase coherent and amplitude stable frequency shift oscillator apparatus comprising:

a first impedance network means including a series combination of resistive and reactive components:

a second impedance network means including a parallel combination of resistive and reactive components;

a negative impedance converter means having a pair of input terminals, said first impedance network means being coupled to one of said input terminals and said second impedance network means being coupled to the other of said input terminals, said converter means being biased into an unstable operating condition; and signal level limiting means coupled to one of said input terminals to stabilize the operation of said oscillator apparatus and provide a means by which an oscillatory output signal can be obtained.

7. A phase coherent and amplitude stable frequency shift oscillator apparatus as recited in claim 6 further including means for simultaneously changing said resistive components so as to change the output frequency of said oscillator apparatus.

8. A phase coherent and amplitude stable frequency shift oscillator apparatus as recited in claim 7 wherein said signal level limiting means includes a buffering amplifier which enables an oscillatory output to be obtained from said oscillator apparatus without loading the input thereof.

9. A phase coherent and amplitude stable frequency shift oscillator apparatus as recited in claim 8 wherein said resistive component changing means includes a plurality of discrete resistance means which may be selectively coupled to said resistive components so as to produce a predetermined variation thereof.

10. A phase coherent and amplitude stable frequency shift oscillator apparatus as recited in claim 8 wherein said reactive components are capacitors.

11. A phase coherent and amplitude stable frequency shift oscillator apparatus as recited in claim 8 wherein said reactive components are inductors.

12. A phase coherent and amplitude stable frequency shift oscillator apparatus as recited in claim 9 wherein said resistive components include ganged variable resistance means for enabling the resistive components of said impedance means to be simultaneously varied over a predetermined range of values.